(12) United States Patent
Patini

(10) Patent No.: US 7,787,889 B1
(45) Date of Patent: Aug. 31, 2010

(54) CUSTOMIZED LOCATION AREA PAGING

(75) Inventor: Joseph James Patini, Woodstock, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 678 days.

(21) Appl. No.: 11/736,207

(22) Filed: Apr. 17, 2007

(51) Int. Cl.
H04W 24/00 (2009.01)

(52) U.S. Cl. .............. 455/456.1; 455/456.5; 455/435.1; 455/515

(58) Field of Classification Search .............. 455/404.2, 455/432.1, 433, 435.1–435.3, 456.1–460, 455/515
See application file for complete search history.

(56) References Cited

U.S. PATENT DOCUMENTS 5,590,398 A 12/1996 Matthews

| 2005/0101323 | A1* | 5/2005 | De Beer | 455/435.2 |
| 2006/0121916 | A1* | 6/2006 | Aborn et al. | 455/456.5 |
| 2006/0189332 | A1* | 8/2006 | Benco et al. | 455/458 |
| 2006/0217118 | A1* | 9/2006 | Benco et al. | 455/435.1 |

* cited by examiner

Primary Examiner—Rafael Pérez-Gutiérrez
Assistant Examiner—Neda Behrooz
(74) Attorney, Agent, or Firm—Parks IP Law LLC; Jonathan A. Paulis

(57) ABSTRACT

Methods for determining a customized location area (CLA) for a subscriber in a cellular network are provided herein. One such method includes the steps of monitoring the cell to which a mobile station registers; storing data corresponding to the cell within a database; determining at least one CLA based upon the data, the CLA each including at least one cell; storing said at least one CLA; utilizing a predictive algorithm to determine which CLA the mobile station is currently located within, if at least two CLAs are stored; and paging each of the cells associated with the appropriate CLA. Other methods are also provided.

2 Claims, 6 Drawing Sheets

CUSTOMIZED LOCATION AREA PAGING

TECHNICAL FIELD

The present invention relates generally to wireless communications systems and, more particularly, to paging mobile devices in a wireless communications system.

BACKGROUND

In Global System for Mobile communications (GSM) and Universal Mobile Telecommunications System (UMTS), location areas (LA) are used to define the cells which will be paged to locate a particular mobile station (MS). Location areas are defined by the mobile operator and assigned a Location Area Identity (LAI). The LAI uniquely identifies a LA within the network. The LAI typically comprises a Mobile Country Code (MCC) to identify the country in which the network resides; a Mobile Network Code (MNC) to identify the network; and a Location Area Code (LAC) to identify the LA.

Typically, when a mobile terminated call, message, or page is sent to a MS, it is routed to the MS's last known LA. If the MS does not respond to the first attempt, the call, message, or page is routed to all the LAs associated with the Mobile Switching Center (MSC). The second MSC-wide paging attempt utilizes a significant amount of Base Station Subsystem (BSS) and MSC resources, and associated interfaces. In some instances, a mobile operator may choose to page the last known LA additional times in an effort to reach the MS; however, these attempts are often not successful.

Customized paging systems have been developed in an effort to decrease the paging area and accordingly decrease the use of network resources. In one such system, a mobile operator defines a LA based on the particular roaming habits of a mobile subscriber. The LA employs a predetermined grouping of cells arranged in the order of likelihood that the mobile subscriber will be in that grouping. This system merely stores the cells the subscriber most often frequents to define the LA.

In another paging system, the last known cell that is sufficiently interior to a LA causes the system to page only that LA. In contrast, when the last known cell is sufficiently towards the border of a LA, that LA is paged as well as the bordering LA(s).

These prior art systems, however, do not allow a mobile operator to define customized location areas based upon at least the time, date, and duration in which a subscriber is in communication with a particular cell or group of cells.

SUMMARY

The various embodiments of the present invention overcome the shortcomings of the prior art by providing methods for determining a customized location area (CLA) for a subscriber in a cellular network. One such method includes the steps of monitoring the cell to which a mobile station registers; storing data corresponding to the cell within a database; determining at least one CLA based upon the data, the CLA each including at least one cell; storing said at least one CLA; utilizing a predictive algorithm to determine which CLA the mobile station is currently located within, if at least two CLAs are stored; and paging each of the cells associated with the appropriate CLA.

In one embodiment, the data is at least one of the following: the frequency which the mobile station registers with the cell, the time the mobile station registers with the cell, the date the mobile station registers with the cell, and the time duration the mobile station is registered with the cell.

In another embodiment, the predictive algorithm utilizes at least one of a last known location and a priority level to determine which CLA the mobile station is currently located within.

Another method according to the present invention includes the steps of establishing communication between a mobile station and a cell; acquiring a cell identification corresponding to the cell and storing the cell identification in a network database; storing a start time when the mobile station establishes communication with the cell; enabling a frequency counter, the frequency counter being configured to track the number of times the mobile station establishes communication with the cell; incrementing the frequency counter; storing the frequency counter value; terminating communication with the cell; storing a stop time when the mobile station terminates communication with the cell; calculating a duration from the start time and the stop time; storing the duration; establishing communication with at least one subsequent cell; performing each of the steps for the subsequent cell; determining a CLA based upon the data acquired during the steps for each of the cells, the data including the cell identification, the start time, the frequency counter, the stop time, and the duration; storing the CLA; and paging each of the cells associated with the CLA.

According to another embodiment of the present invention, a computer-readable memory includes computer-executable instructions which, when executed, perform the steps of the above methods.

The foregoing has broadly outlined some of the aspects and features of the present invention, which should be construed to be merely illustrative of various potential applications of the invention. Other beneficial results can be obtained by applying the disclosed information in a different manner or by combining various aspects of the disclosed embodiments. Accordingly, other aspects and a more comprehensive understanding of the invention may be obtained by referring to the detailed description of the exemplary embodiments taken in conjunction with the accompanying drawings, in addition to the scope of the invention defined by the claims.

DETAILED DESCRIPTION OF THE INVENTION

As required, detailed embodiments of the present invention are disclosed herein. It must be understood that the disclosed embodiments are merely exemplary of the invention that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present invention. Therefore, specific structural and functional details disclosed herein are not to be interpreted as limiting, but merely as a basis for the claims and as a representative basis for teaching one skilled in the art to variously employ the present invention.

Figure 1:
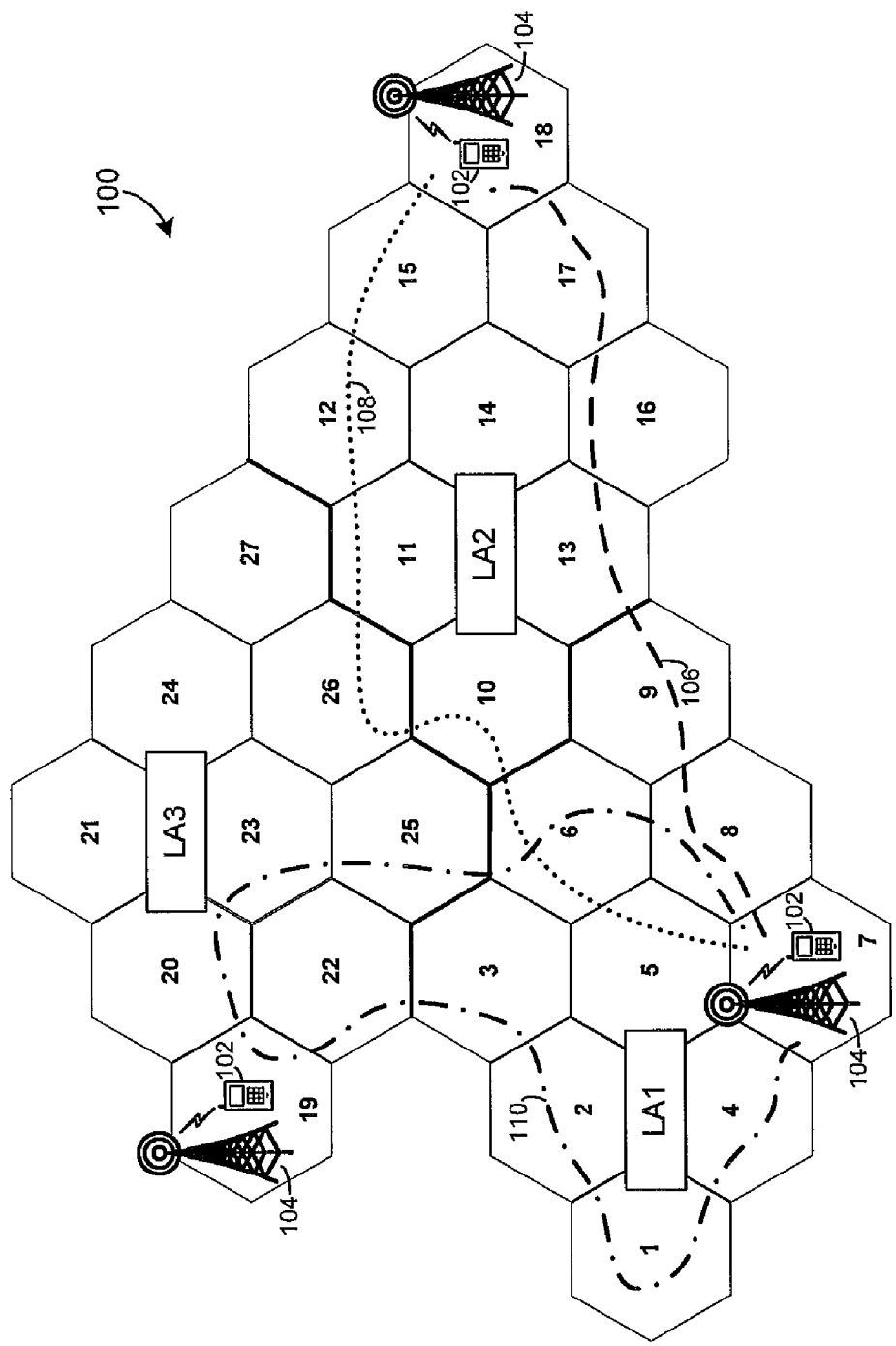
FIG. 1 illustrates a network schematic in accordance with an exemplary embodiment of the present invention.

Referring now to the drawings in which like numerals represent like elements throughout the several views, FIG. 1 illustrates a cellular network 100 in accordance with an embodiment of the present invention. The cellular network 100 includes three location areas: LA1, LA2, and LA3. LA1 includes cells 1-9; LA2 includes cells 10-18; and LA3 includes cells 19-27. By way of example, a user of a mobile station (MS) 102 resides in LA1 and is served by the base station 104 of cell 7. By further example, this user works in LA2 and, in particular, his office is located in cell 18. Accordingly, the user travels between cells 7 and 18 during his/her normal work week (e.g., Monday through Friday, 9 AM to 5 PM). During his commute the user traverses cells 8, 9, 13, 16, and 17. The user's morning commute is labeled as path 106.

By way of example, in the evening, the user commutes home via a different path in an effort to avoid traffic. This path is labeled as path 108. Path 108 starts at cell 18 and traverses cells 15, 12, 11, 26, 10, 6, and 5, and ends at cell 7.

In addition to the generic location areas established by the mobile operator (i.e., location areas LA1, LA2, and LA3), the mobile operator can establish one or more customized location areas (CLAs) for a subscriber, in accordance with an embodiment of the present invention. The CLAs are used to page a particular subscriber's MS instead of or prior to paging one or more generic location areas. The customized location areas are defined by the aforementioned paths and will be referred to hereafter by the reference numeral assigned to each of the paths.

Moreover, CLAs can be defined for specific dates and times such as those previously described with regard to the user's path 106 from their home (cell 7) to their office (cell 18) in the morning and the user's path 108 from their office to their home in the evening. It is contemplated that specific times or time ranges can be used to define at least in part a CLA for a particular subscriber.

In addition to paths 106 and 108, the user may have a weekend routine that requires him to travel, for example, from cell 7, through cells 4, 1, 2, 3, 22, 19, 20, 23, 25, 6, and 8, and back to cell 7. This exemplary path is illustrated and labeled as path 110. If the network needs to page the MS 102 during the weekend, paging the CLA defined by the cells of path 106 and/or path 108 would not be appropriate and would unnecessarily utilize network resources. Accordingly, the present invention would identify the day (i.e., a Saturday or Sunday) and choose the CLA(s) appropriate for the day, which in this case is the CLA defined by the cells inclusive to path 110.

The CLAs can be any size as determined by the mobile operator. For example, a CLA may include one or more generic LAs, or further defined such as the aforementioned CLAs for paths 106, 108, and 110. In addition, the mobile operator can define one or more customized location sub-areas (CLSAs) defined as portions of a parent CLA. In another embodiment, a CLSA can include multiple CLAs or portions thereof. This can allow for further improvement in paging accuracy and precision in an effort to reduce the network resources needed to determine the location of a MS by reducing the total area (in cells) paged.

An exemplary use of a CLSA is now described. For example, the user may stop for breakfast on Tuesdays and Thursdays during his work week. In this example, suppose the user must travel outside of his usual path 106 to cell 5. Accordingly, a CLSA can be defined to include the additional cell, cell 5. The CLSA can then be added to the cells of the parent CLA and accordingly paged, or can be paged individually. Further, a time range (e.g., 7:00 AM to 7:45 AM) can be defined for the time during which the user will likely be in this CLSA. This further reduces the number of unnecessary pages. Methods for acquiring location data such as, but not limited to, including date, time, duration, frequency, and cell sequences are described in further detail with referenced to FIGS. 3-6.

Another example of the use of a CLSA is the addition of cell 5, the cell in which the user's breakfast restaurant resides, to the CLA defined by path 106. The corresponding combination CLA and CLSA would include cells 7, 5, 8, 9, 13, 16, 17, and 18. In one embodiment, the combination CLA could be modified to only include cell 5 during the specified times. An indication as to this modification can be stored with the other location data in an appropriate database.

The aforementioned variables for date, time of day, and duration can be used in any combination or individually to determine a CLA for a particular subscriber. The frequency a subscriber is in a particular cell or group of cells can also be used to determine a CLA. In some embodiments, frequency can be used initially to determine which cells a subscriber frequents. Over time, the time of day and/or calendar day can be used to further define a CLA for the subscriber. The sequence of cells traveled through can also be used to define a CLA. An exemplary method for determining a CLA is described with reference to FIG. 4.

The mobile operators can determine the complexity of the CLA(s) and CLSA(s) for each subscriber. These determinations are made based upon historical location data provided to the mobile operator's network via registration processes. Over time, the mobile operator can develop more detailed and consequently more accurate and precise CLAs and CLSAs appropriate for each subscriber or group of subscribers.

It is likely that some cells or generic LAs may experience higher subscriber traffic and, as a result, paging resources may be more limited in these cells or LAs. Thus, it may be beneficial for the service provider to have particularly detailed CLAs and/or CLSAs for the subscribers that frequent these areas so as to eliminate unneeded page attempts.

It should be understood that although a single subscriber is described with reference to FIG. 1, a group of subscribers can be associated with a CLA and/or a CLSA. The subscriber's designation in a particular group can be modified as the subscriber's historical location data changes.

Figure 2:
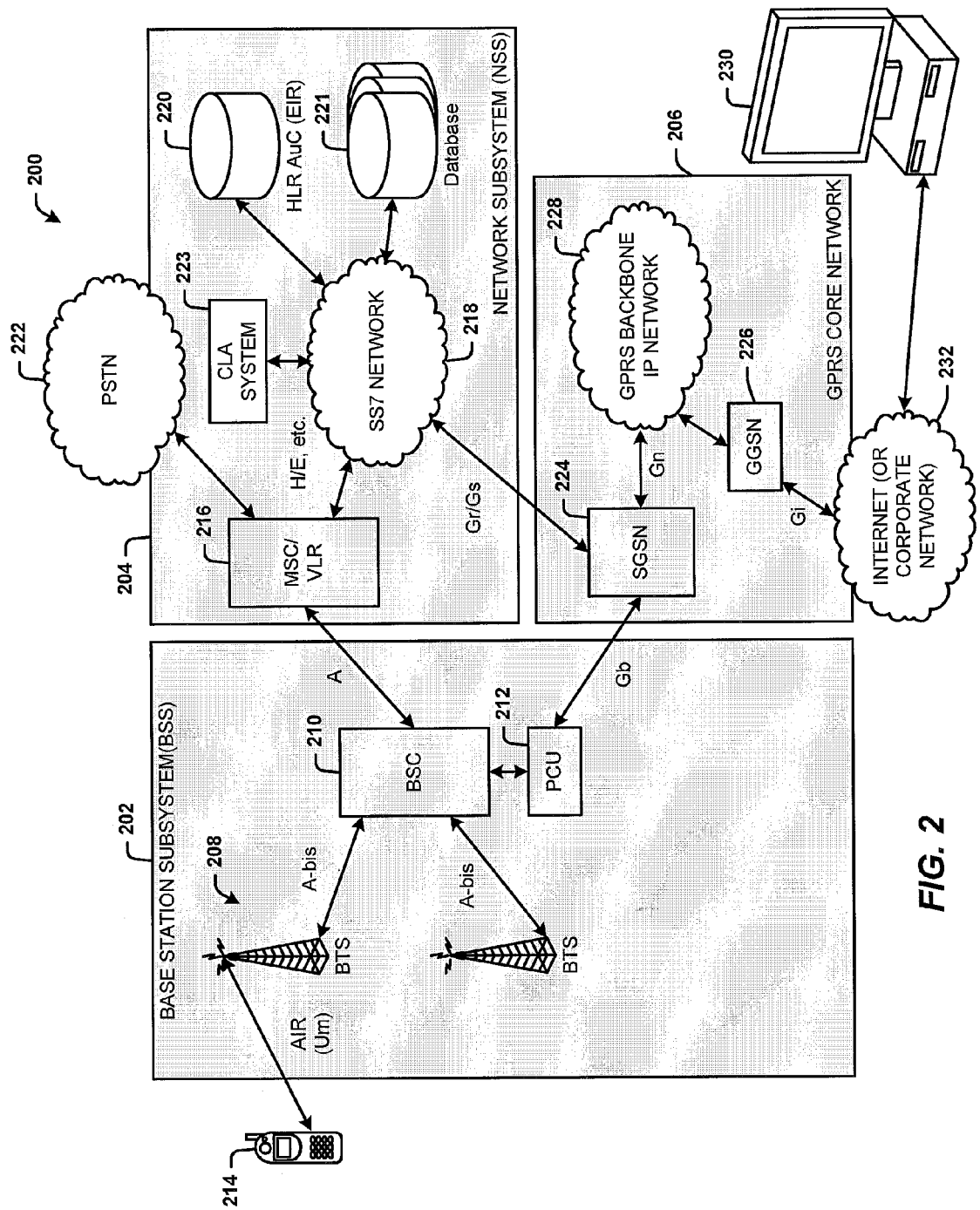
FIG. 2 illustrates a system diagram of a Global System for Mobile communications (GSM) network, in accordance with the present invention.

FIG. 2 illustrates an exemplary Global System for Mobile communications (GSM) network 200 that can be used to implement the present invention. The GSM network 200 includes a base station subsystem (BSS) 202, a network subsystem (NSS) 204 and a General Packet Radio Service (GPRS) core network 206. The BSS 202 can include one or more base transceiver stations (BTS) 208 and a base station controller (BSC) 210 communicatively linked via an A-bis interface. The BSS 202 allows a cellular telephone to communicate with a cellular network. BTSs are all interconnected to facilitate roaming from one cell to another via a process called handover, without losing the cell connection.

A packet control unit (PCU) 212 is shown as being in communication with the BSC 210 although the exact position of this can depend on the vendor architecture. The BSS 202 is connected by the air interface Um to a mobile terminal 214. The BTS 208 are the actual transmitters and receivers of radio signals. Typically, a BTS for anything other than a picocell will have several different transceivers (TRXs) which allow it to serve several different frequencies or even several different cells (in the case of sectorized base stations).

The BSC 210 provides the intelligence behind the BTS 208. Typically, a BSC 210 can have tens or even hundreds of BTSs 208 under its control. The BSC 210 handles allocation of radio channels, receives measurements from the mobile phones, and controls handovers from BTS to BTS (except in the case of an inter-MSC (Mobile Switching Center) handover, in which case control is in part the responsibility of the an MSC). One function of the BSC 210 is to act as a concentrator such that many different low capacity connections to the BTS 208 can become reduced to a smaller number of connections towards the MSC. Generally, this means that networks are often structured to have many BSCs 210 distributed into regions near the BTS 208 which are then connected to large centralized MSC sites.

The PCU 212 can perform some of the equivalent tasks of the BSC 210. The allocation of channels between voice and data can be controlled by the base station, but once a channel is allocated to the PCU 212, the PCU 212 takes full control over that channel. The PCU 212 can be built into the base station, built into the BSC, or even in some architecture it can be at a Serving GPRS Support Node (SGSN) site.

The BSS 202 is communicatively linked to the NSS 204 by an A interface. The NSS 204 is illustrated with a Mobile Switching Center (MSC) 216 connected via an SS7 network 218 to an HLR 220. The AuC and the EIR, although technically separate functions from the HLR 220, are shown together since combining them can be performed in the network. In accordance with the present invention, the HLR 220 can be configured to store historical location data associated with each subscriber. In addition, the HLR 220 can be configured to store CLAs and/or CLSAs for each subscriber. In addition to the HLR 220 or as an alternative, one or more databases 221 can be used to store the historical location data and the CLAs/CLSAs.

The combination of a cell phone 214 and a SIM card (not shown) creates a special digital signature that includes a subscriber number which is sent from the cell phone 214 to the nearest BTS 208 asking that the subscriber of a particular network be allowed to use the network. The request is passed on along the network of BTS 208 to the heart of a cellular network, the MSC 216. The MSC 216 also routes all incoming and outgoing calls to and from the fixed-line networks or other cellular networks. When the user wants to make an outgoing call, another section of the MSC called the VLR checks whether the caller is actually allowed to make that call. For example, if the caller is barred for international dialing, a message to that effect will be generated by the VLR, sent along the network, and almost instantly back to the cell phone.

The HLR 220 provides the administrative information required to authenticate, register and locate the caller as that network's subscriber. Once the HLR 220 has received a logon request, the HLR 220 immediately checks the special signature contained in the request against the HLR special subscriber database. If the subscription is current, the MSC 216 sends a message back to the phone via the BTS 208 that indicates the caller is allowed to access the network. The name or code of that network will appear on the LCD screen of the cell phone 214. Once this network name message appears on the phone LCD screen, it means the caller is connected to the network and able to make and receive calls.

The HLR 220 registers which MSC the cell phone is currently connected to, so that when the network MSC 216 needs to route an incoming call to the cell phone number, the network MSC 216 will first check the HLR 220 to see which MSC is currently serving the cell phone. Periodically, the cell phone will send a message to the MSC indicating where it is, in a process called polling. The combination of the tracking function and the caller's unique digital signature allows the MSC 216 to route that call to the precise base station the cell phone happens to be connected to, and then exclusively to the cell phone, even if a number of other subscribers are simultaneously connected to that base station.

When traveling to another MSC coverage area while driving, for example, the HLR 220 is automatically updated, and continues to monitor where exactly it should route the calls should the caller then move within range of another base station. This routing procedure means that out of hundreds of thousands of subscribers, only the correct cell phone will ring when necessary.

In the present invention, the HLR 220 and/or the databases 221 are in communication with a CLA system 223. The functionality of the CLA system 223 can be incorporated within the MSC/VLR 216 and/or other elements of the GSM network 200. The CLA system 223 is responsible for acquiring historical location data for a subscriber and determining one or more appropriate CLAs and/or CLSAs for that subscriber. The location information and the resulting CLAs and/or CLSAs can be stored in the appropriate databases such as, for example, the HLR 220 and/or databases 221. Exemplary methods for determining CLAs and paging MSs at these CLAs are described with reference to the remaining figures.

The NSS 204 has a direct connection to the Public Switched Telephone Network (PSTN) 222 from the MSC 216. There is also a link from the NSS 204 to the GPRS core network 206 via a Gr/Gs interface although this is optional and not always implemented. The illustrated GPRS Core Network 206 is simplified to include an SGSN 224 (communicatively linked to the BSS 202 by the Gb interface) and a GGSN 226. The SGSN 224 and the GGSN 226 are communicatively linked to each other by a private Internet Protocol (IP) network 228 called a GPRS backbone shown as the Gn reference point. A computer 230 is depicted as being in communication with the GPRS core network 206 via the Internet or a corporate network 232.

Although a GSM network is illustrated, the exemplary paging system and methods described herein can be extended to any applicable network such as, but not limited to, a Universal Mobile Telecommunications System (UMTS) network, for example.

Figure 3:
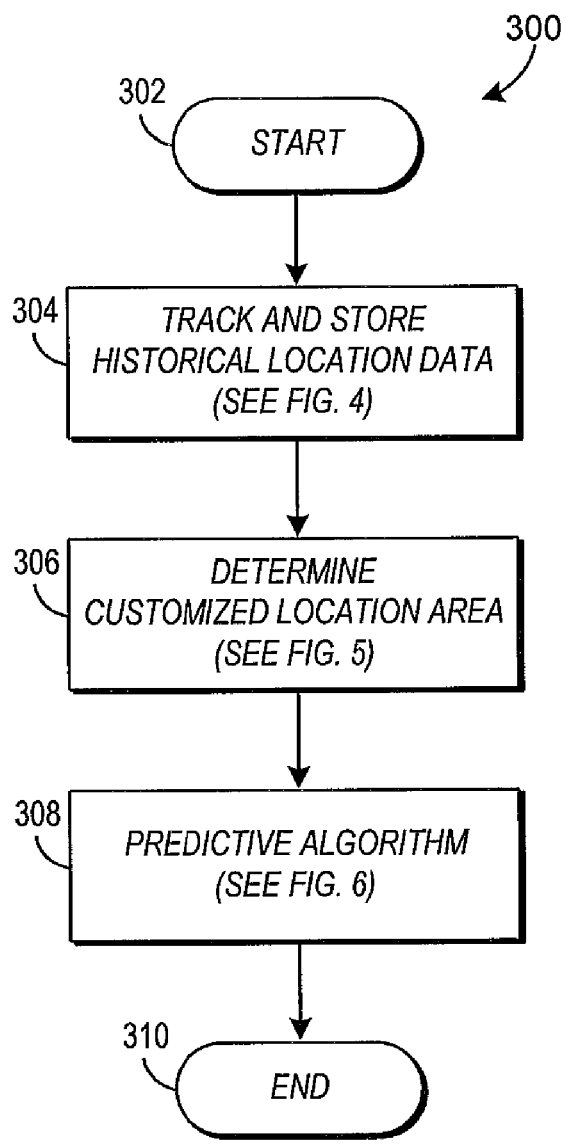
FIG. 3 illustrates a block diagram of an exemplary method for acquiring location data, determining a customized location area, and selecting a page-to location area, according to the present invention.

Referring now to FIG. 3, a block diagram of an exemplary method 300 is illustrated, according to the present invention. It should be understood that the illustrated methods with respect to FIGS. 3-6 are not limited to the steps shown nor the order of the steps shown and are provided solely as a basis for teaching exemplary embodiments of the present invention. Accordingly, amendments to these methods and/or the addition, elimination, or combination of one or more steps may be made to achieve like results and still be within the scope of the present invention.

The method 300 broadly outlines the basic steps for arriving at the present invention. The individual steps are further defined in FIGS. 4-6, each of which is described below in detail.

The method 300 begins at step 302 and proceeds to step 304, wherein historical location data is tracked and stored in a network database such as, for example, an HLR. It is contemplated that a separate database such as one particularly used to implement the storage needs of the present invention may alternatively or additionally be used to store the historical location data. The acquisition of historical location data and the storage thereof is described in further detail with reference to FIG. 4.

The term "historical location data" is used herein to describe data associated with a location (cell or group of cells) such as, but not limited to, the number of times a subscriber visits a location (frequency), the date, the time a subscriber is in a location (duration), the time of day, and the sequence of cells visited by a subscriber (sequence).

After the historical location data is acquired in step 304, the method 300 proceeds to step 306 wherein at least one CLA is determined. This determination is described in further detail with reference to FIG. 5.

The method 300 then proceeds to step 308, wherein a predictive algorithm is used, in an effort to minimize page attempts, to predict which CLA(s) and/or CLSA(s) the service provider should page. The predictive algorithm is described in further detail with reference to FIG. 6. After step 308, the method 300 ends at step 310.

Figure 4:
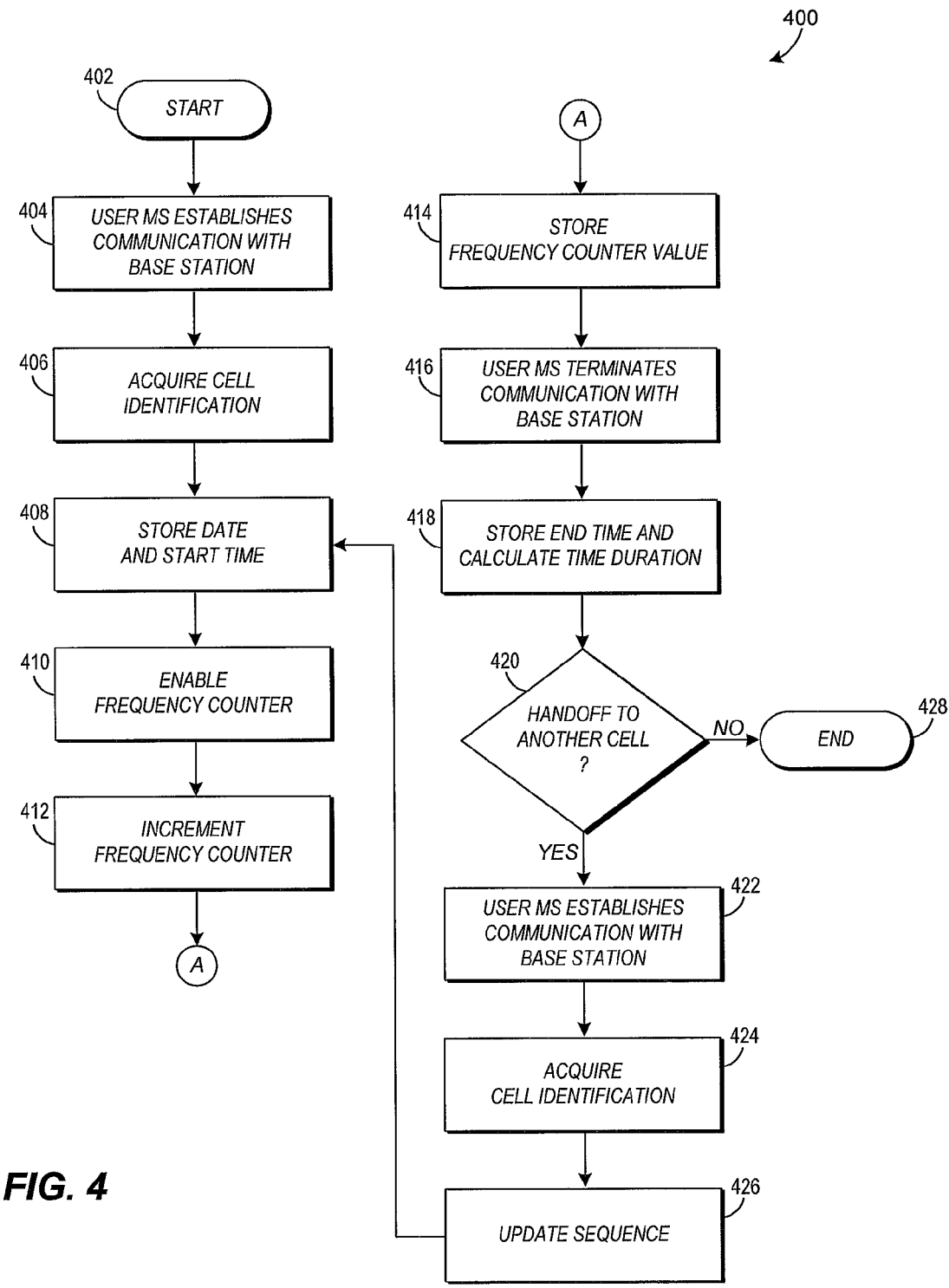
FIG. 4 illustrates a block diagram of an exemplary method for tracking and storing location data, according to the present invention.

Referring now to FIG. 4, an exemplary method 400 for tracking and storing location data is illustrated in accordance with one embodiment of the present invention. The method 400 begins at step 402 and proceeds to step 404, wherein a subscriber's MS establishes communication with a base station. To aid in describing method 400, reference will simultaneously be made to FIG. 1. Accordingly, the subscriber's MS 102 establishes communication with the base station 104 in cell 7. At step 406, the network cell identification is determined so that the network knows to which cell MS 102 is presently in communication. After the cell identification is acquired in step 406, the method 400 proceeds to step 408 wherein the current date and time are acquired and stored. The date, for example, can include the day of the week, day of the month, month, and/or year. Again, storage for the date, time, and/or other location data can be provided by the HLR and/or a supplemental storage system such as a network database.

After the date and time are stored, a frequency counter is enabled at step 410. The frequency counter is used to maintain the number of instances in which a subscriber's MS visits a particular cell or group of cells. The frequency counter is incremented in step 412 to account for the present visit. The frequency counter value is stored in step 414.

At step 416, the MS 102 terminates communication with the base station and the method proceeds to step 418 wherein the time is stored and the time duration is calculated. At step 420 it is determined if a handoff was performed. If a handoff was performed, the method 400 proceeds to step 422 wherein the MS 102 establishes communication with the new cell's base station. The new cell's identification is acquired in step 424 and the cell sequence is updated in step 426. By way of example, a MS 102 could establish communication with a first cell (e.g., cell 7) and travel to a second cell (e.g., cell 8) thus establishing a sequence of cells, that is, cell 7 to cell 8. As the MS 102 travels to new cells, this sequence is updated to reflect the new sequence. By way of example, path 106 could be established based on the sequence of cells 7, 8, 9, 13, 16, 17, and 18, thus establishing a CLA incorporating the cells of path 106. The frequency, date, and time duration can be acquired and used to further define a CLA or CLSA.

After the sequence is updated in step 426, the method 400 proceeds to step 408 wherein the date and start time is stored for the new cell. The method 400 continues in loop through the steps as previously described until no cell handoff is detected. If at step 420 it is determined that no cell handoff has occurred, then the method 400 proceeds to step 428 and the method 400 ends.

Figure 5:
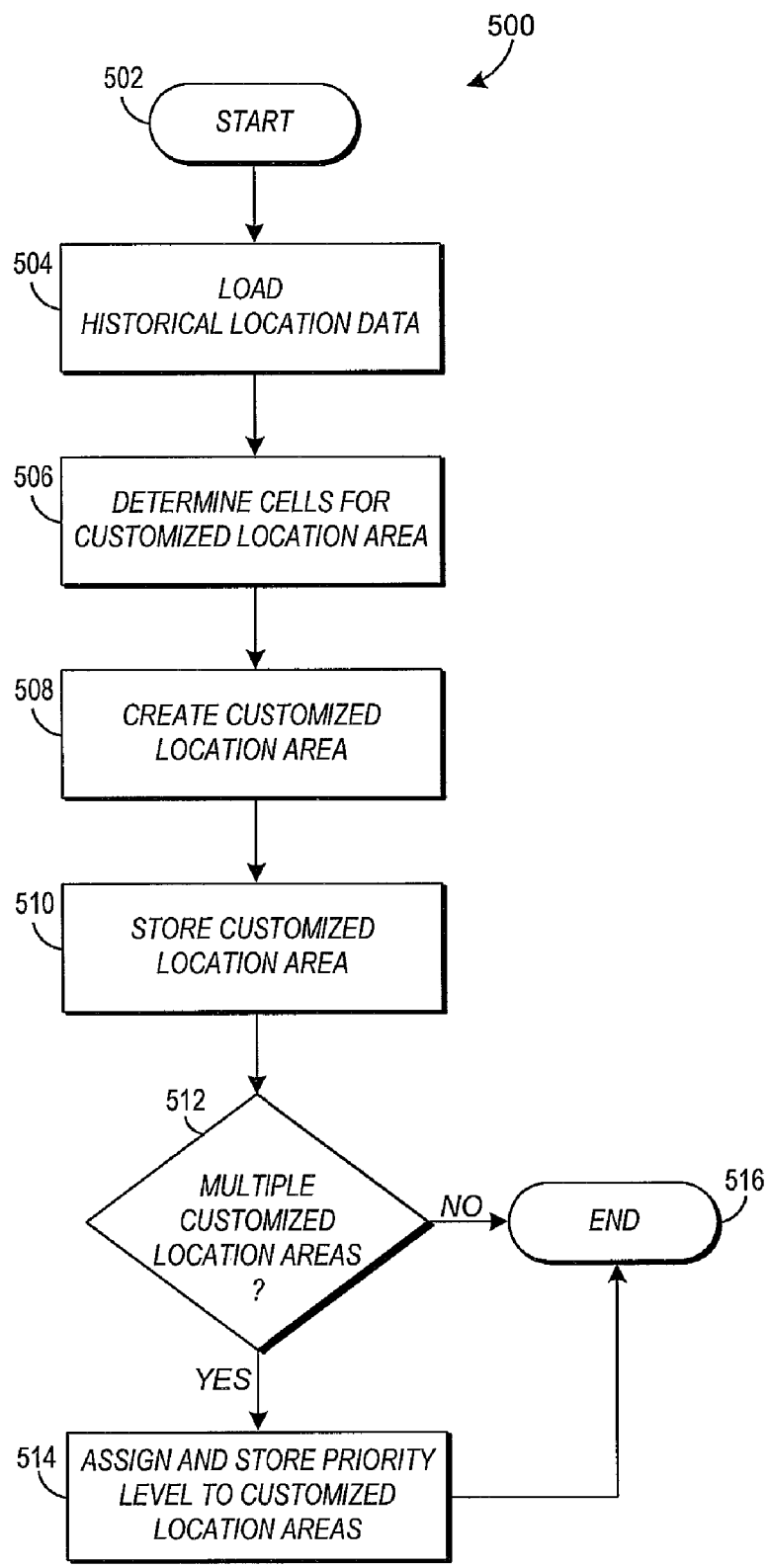
FIG. 5 illustrates a block diagram of an exemplary method for determining a customized location area for a subscriber, according to the present invention.

Referring now to FIG. 5, an exemplary method 500 for determining a CLA for a subscriber is illustrated, according to the present invention. The method 500 begins at step 502 and proceeds to step 504, wherein the historical location data acquired during method 400 is loaded. At step 506, the cells are determined for a CLA.

As previously described, the CLA system 223 and the HLR 220 and/or databases 221 acquire and store location data. Accordingly, the frequency as stored in step 414 can be used to determine to which cells the subscriber most frequently visits. As is also described in method 400, a date, start time, and end time are acquired and used to calculate a duration. The date, start time, end time, and duration are used by the CLA system 223 to determine the cells for a CLA. The CLA system 223 can implement a priority scheme to prioritize the data types in making a CLA determination. The criteria used to establish the priority scheme can be any as selected by the mobile operator such as is appropriate for the operator's subscriber base.

At step 508, a CLA is created from the determined cells. The CLA is stored in the HLR 220 and/or the database 221 in step 510 for later use.

The present invention may include a priority scheme for multiple CLAs associated with a subscriber. At step 512, it is determined if multiple CLAs exist for the subscriber. If multiple CLAs exist, each CLA is assigned a priority level at step 514. The priority level can be used to determine which CLA to page for a given situation. If only one CLA exists for a subscriber, the method 500 proceeds to step 516 and the method 500 ends.

Figure 6:
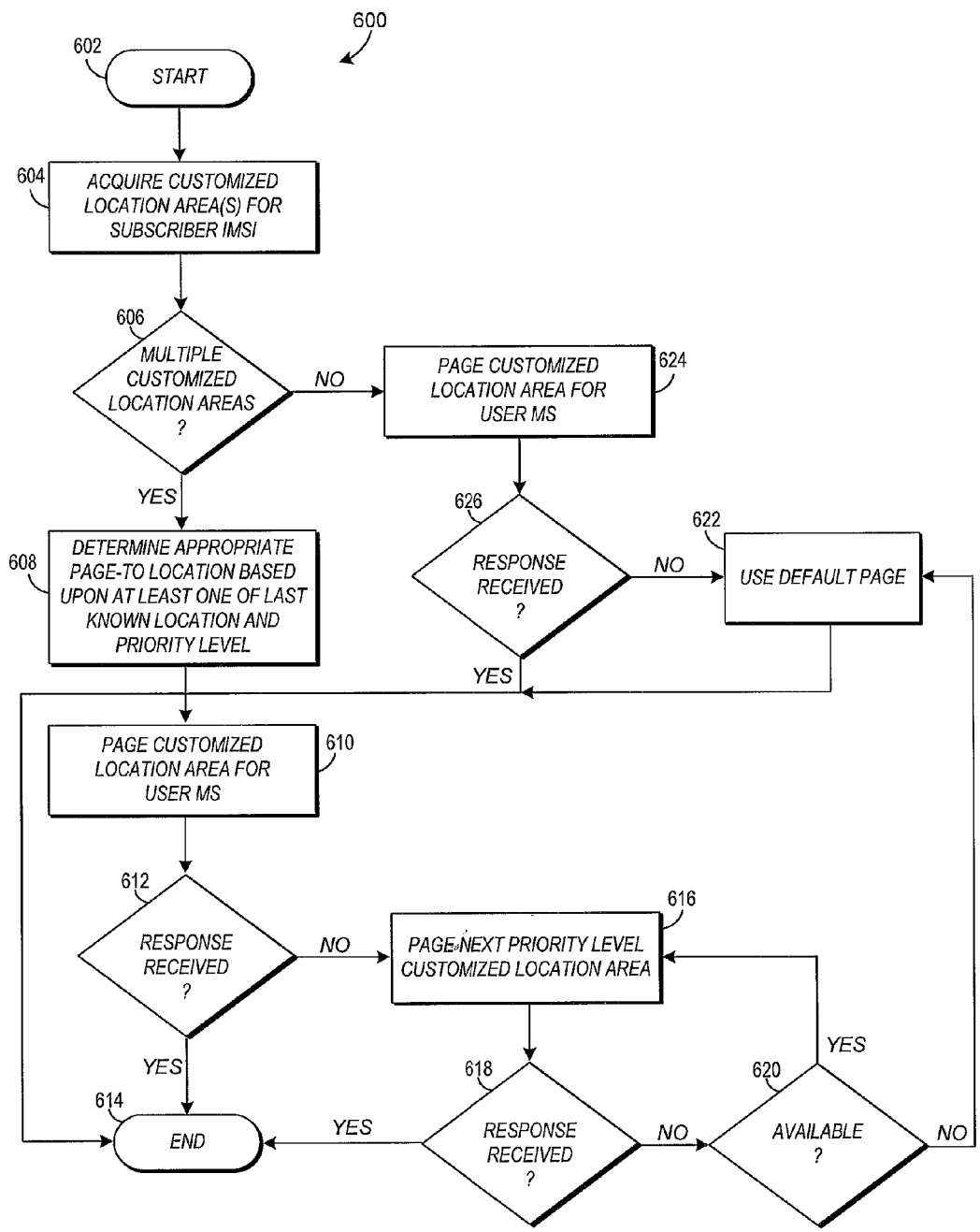
FIG. 6 illustrates a block diagram of an exemplary method of a predictive algorithm for determining which location area to page, according to the present invention.

Referring now to FIG. 6, an exemplary method 600 of a predictive algorithm for determining which location area to page, according to the present invention. The method 600 begins at step 602 and proceeds to step 604, wherein the CLA(s) is acquired for a subscriber. The CLA(s) can be associated with a subscriber's International Mobile Subscriber Identity (IMSI). It should be understood that the paging scheme used by the present invention can be based on the subscriber's IMSI or a Temporary Mobile Subscriber Identity (TMSI).

At step 606, it is determined if multiple CLAs exist. If multiple CLAs exist, then the method 600 proceeds to step 608 and the page-to location is determined The page-to location can be determined based upon at least one of the priority level set in step 514 and the last known location. The last known location can be used to determine which CLA includes the most recent cell. The priority level can be used solely or in combination with the last known location to determine an appropriate page-to location.

After the page-to location is determined in step 608, the method 600 proceeds to step 610 wherein the CLA is paged for the subscriber's MS. If a response is received at step 612, the method 600 proceeds to step 614 and the method 600 ends. If, however, no response is received, the method 600 proceeds to step 616 and the next priority level CLA is paged. If a response is received after this subsequent attempt at step 618, the method 600 proceeds to step 614 and the method 600 ends. If, however, no response is received, the method 600 proceeds to step 620, wherein it is determined if an additional CLA is available. If another CLA is available then the method 600 reverts back to step 616 and the next priority CLA is paged. This loop continues unit either a response is received or no more prioritized CLAs are available. In some embodiments, a limit may be set by the mobile operator to limit the number of page attempts prior to executing a default page as illustrated in step 622. Also, if no prioritized CLAs are available, the default page of step 622 is used. After the default page, the method 600 proceeds to step 614 and the method 600 ends. It is contemplated that the default page can be directed to a generic LA or a CLA. The default page may also include a default page of all LAs for an MSC.

If at step 606 it is determined that only a single CLA exists for a subscriber, the method 600 proceeds to step 624 and the CLA is paged at step 624. If a response is received at step 626, the method 600 proceeds to step 614 and the method 600 ends. If, however, no response is received at step 626, then the default page is used at step 622. The method 600 then proceeds to step 614 and the method 600 ends.

The law does not require and it is economically prohibitive to illustrate and teach every possible embodiment of the present claims. Hence, the above-described embodiments are merely exemplary illustrations of implementations set forth for a clear understanding of the principles of the invention. Variations, modifications, and combinations may be made to the above-described embodiments without departing from the scope of the claims. All such variations, modifications, and combinations are included herein by the scope of this disclosure and the following claims.

The invention claimed is:

1. A method for determining a customized location area (CLA) for a subscriber in a cellular network, the method comprising:
    acquiring a first cell identification corresponding to an initial cell to which a mobile station has established communication;
    storing the first cell identification in a network database;
    storing a start time at which the mobile station establishes communication with the initial cell;
    enabling a frequency counter, the frequency counter being configured to track the number of times the mobile station establishes communication with the initial cell;
    incrementing the frequency counter to account for a present visit of the mobile station to the initial cell;
    storing a frequency counter value indicating the number of times the mobile station has established communication with the initial cell including the present visit;
    receiving an indication that the mobile station has terminated communication with the initial cell;
    storing a stop time when the mobile station terminates communication with the initial cell;
    calculating a duration from the start time and the stop time;
    storing the duration;
    acquiring a second cell identification corresponding to a subsequent cell to which the mobile station has established communication;
    performing each of the steps for the subsequent cell;
    determining a CLA based upon data acquired during the steps for each of the cells, wherein:
        the CLA comprises at least one cell; and
        the data comprises the cell identification for the initial cell and the subsequent cell, the start times for the initial cell and the subsequent cell, the frequency counter for the cell and the subsequent cell, the stop time for the initial cell and the subsequent cell, and the duration for the initial cell and the subsequent cell;
    storing the CLA; and
    paging each cell associated with the CLA.

2. A non-transitory computer-readable medium comprising computer-executable instructions which, when executed, perform the steps of:
    acquiring a first cell identification corresponding to an initial cell to which a mobile station has established communication;
    storing the first cell identification in a network database;
    storing a start time at which the mobile station establishes communication with the initial cell;
    enabling a frequency counter, the frequency counter being configured to track the number of times the mobile station establishes communication with the initial cell;
    incrementing the frequency counter to account for a present visit of the mobile station to the initial cell;
    storing a frequency counter value indicating the number of times the mobile station has established communication with the initial cell including the present visit;
    receiving an indication that the mobile station has terminated communication with the initial cell;
    storing a stop time when the mobile station terminates communication with the initial cell;
    calculating a duration from the start time and the stop time;
    storing the duration;
    acquiring a second cell identification corresponding to a subsequent cell to which the mobile station has established communication;
    performing each of the steps for the subsequent cell;
    determining a CLA based upon data acquired during the steps for each of the cells, wherein:
        the CLA comprises at least one cell; and
        the data comprises the cell identification for the initial cell and the subsequent cell, the start times for the initial cell and the subsequent cell, the frequency counter for the cell and the subsequent cell, the stop time for the initial cell and the subsequent cell, and the duration for the initial cell and the subsequent cell;
    storing the CLA; and
    paging each cell associated with the CLA.

* * * * *